United States Patent [19]

Olmsted, Jr.

[11] 4,325,844
[45] Apr. 20, 1982

[54] METHOD OF PREPARING DIATOMITE FOR RAPID CALCINATION

[75] Inventor: Bruce C. Olmsted, Jr., Littleton, Colo.

[73] Assignee: Manville Service Corporation, Denver, Colo.

[21] Appl. No.: 151,561

[22] Filed: May 20, 1980

[51] Int. Cl.³ .............................................. B01J 20/14
[52] U.S. Cl. .................................... 252/448; 252/449
[58] Field of Search ............................... 252/448, 449

[56] References Cited

U.S. PATENT DOCUMENTS

| | | | |
|---|---|---|---|
| Re. 19,166 | 5/1934 | Thatcher | 252/449 X |
| 2,423,686 | 7/1947 | Cummins | 252/235 |
| 2,686,161 | 8/1954 | Stewart | 252/448 |
| 2,693,456 | 11/1954 | Fennell | 252/449 |
| 2,701,240 | 2/1955 | Bregar | 252/449 X |
| 3,013,981 | 12/1961 | Riede | 252/449 |
| 3,140,326 | 7/1964 | Erek et al. | 264/117 |
| 3,206,528 | 9/1965 | Coombs et al. | 264/117 |

Primary Examiner—Carl F. Dees
Attorney, Agent, or Firm—Robert M. Krone; Joseph J. Kelly

[57] ABSTRACT

An energy-saving process for the calcination of diatomite is described. Diatomite particles and water are mixed to form a mixture with a moisture content in the range of 15 to 50 weight percent and then balled to form generally spherical balls, preferably with diameters of 1.5 to 20 mm. The balled diatomite, which may also contain a flux or whitening agent, is then calcined at about 1700° F. to 2350° F. (923° C. to 1290° C.). The process reduces the time required for calcination to about 0.75 to 30 minutes from the 30 to 90 minutes required in prior art processes, and thus also reduces the amount of thermal energy required to calcine a given unit of diatomite. The balls enable calcination to be performed using an externally heated tube furnace a fluid bed or a travelling grate. Calcination is highly uniform and little attrition of balls is observed. Fine dusts of good purity as well as materials heretofore considered waste can be processed to usable products by this invention. High blue light brightness can be obtained.

29 Claims, No Drawings

METHOD OF PREPARING DIATOMITE FOR RAPID CALCINATION

TECHNICAL FIELD

The invention herein relates to the formation of calcined diatomite products.

BACKGROUND OF THE PRIOR ART

For many years diatomite products have been used as filter aids in a wide variety of filtration processes. Diatomite filter aids are normally marketed as three different types: natural diatomite, calcined diatomite and flux calcined diatomite. The natural diatomite is diatomite which has been mined, dried, crushed and classified as by air separating or screening into diatomite granules or particles of specified size ranges. Calcined diatomite is diatomite which is mined, dried, granulated and passed through a kiln which is operated at temperature on the order of about 1800° F. to 2400° F. (980° C. to 1315° C.). The calcination causes the diatomite particles to shrink and harden and, to a certain extent, to agglomerate themselves into larger clusters. Calcination is enhanced by the use of fluxes such as sodium carbonate mixed through the diatomite powder prior to its being passed through the kiln. In general, the natural diatomites are used to provide high clarity of liquid filtrates, but have the disadvantage of having low flow rates of filtrate through the diatomite filter aid bed. The calcined materials provide progressively higher flow rates but result in lesser degrees of clarification of the filtrate per pass of filtrate through the filter aid bed.

In order to obtain a sufficient degree of calcination for calcined diatomites, considerable amounts of thermal energy must be used to maintain the kilns at the appropriate temperature during the prolonged period of approximately 30 to 90 minutes which it takes for the diatomite to pass through the kiln and become thoroughly calcined. This, of course, results in a large quantity of heat being required per individual unit of diatomite passed through the kiln. Researchers in the prior art have investigated various ways of reducing this per unit requirement of heat. One such approach was described by R. G. Riede in U.S. Pat. No. 3,013,981. In Riede's process, approximately 10 to 100 percent by weight of water or other liquid binder was added to diatomite. The two were mixed for a prolonged period in order to plasticize the mixture. A flux in the form of a dry powder or a liquid solution could also be added to the mixture of diatomite and liquid binder. Thereafter the material in the form of randomly sized agglomerated particles was passed into the kiln for calcination. Calcining times continued to be on the order of 30 to 90 minutes, but the Riede process of forming random sized agglomerates permitted kiln calcination temperatures to be reduced to temperatures on the order of about 1700° F. to 1850° F. (925° C. to 1000° C.). While the Riede process was used for some time for "flux calcining" because it simplified the incorporation of flux (dissolved in the water) into the diatomite, it was gradually displaced by calcination processes which utilized dry flux addition to diatomite without the presence of a binder. While these processes required somewhat greater kiln times to effect calcination, the economics as compared to the water-addition systems were more favorable with the lower energy costs then prevailing.

Wetting of diatomite has also been mentioned in U.S. Pat. No. 2,693,456 to J. E. Fennell. In the Fennell process 20 to 50 percent water is incorporated into dry diatomite powder along with flux prior to conventional flux calcination of the diatomite powder. The water presence is said to improve the filtration rate and color properties of the end product. The calcination process is described as conducted under ordinary time and temperature conditions, with no improvement in either mentioned.

In more recent years, energy costs have climbed immensely. It has therefore become imperative to develop a process for the calcination of diatomite which will result in substantial reductions in the usage of thermal energy per unit of diatomite processed while yet providing a finished product having the required and desirable properties of the prior art diatomites. The Riede process has been considered but has not been determined to be adequate, for the small amount of reduction in kiln temperature available through the Riede process does not offset the disadvantage that the Riede process still requires prolonged kiln processing time. It would therefore be highly desirable to have a process which would permit a significant reduction in the amount of time required to effect calcination of diatomite and which would provide for a major reduction in the amount of thermal energy required for complete calcination.

BRIEF SUMMARY OF THE INVENTION

The invention herein provides a process for the preparation of calcined diatomite which permits a significant reduction in the amount of time required to effect that calcination. In the process of this invention, the diatomite particles which have previously been mined and crushed to a size suitable for conveying are mixed with water to form a wetted diatomite containing from about 15 to about 50 weight percent water based on the total weight of the wetted diatomite, and the wetted diatomite particles are formed into generally spherical balls which are then used as the feed for the calcination kilns. Preferably the generally spherical balls of diatomite have diameters on the order of approximately 1.5 to 20 mm. Thereafter the balls are calcined for a time in the range of from about 0.75 to about 30 minutes at a temperature in the range of from about 1700° F. to about 2350° F. (925° C. to 1290° C.). Calcination may be conducted in conventional rotary kilns but more preferably is obtained through the use of travelling grates of fluid beds, neither of which have heretofore been suitable for the calcination of diatomite because of the powder or granular form of the prior art diatomite feeds. The process also has the advantage of permitting the diatomite processor to recycle, recover and satisfactorily calcine portions of materials which would heretofore have been considered to be unusable waste or unrecoverable fine dust. The diatomite products of this process are essentially identical in properties with the prior art calcined and flux calcined diatomite materials.

DETAILED DESCRIPTION OF THE INVENTION

The invention herein involves treatment of diatomite powders prior to calcination of the diatomite, which treatment permits a dramatically reduced calcination time and an equivalent reduction in the amount of thermal energy necessary to effect complete calcination of a given quantity of diatomite.

(As used herein, the term "calcination" is normally meant to include all calcination heating of diatomite, whether or not fluxes are also present. Where either flux calcining or non-flux calcining are individually meant, they will be so identified.)

Diatomite (which is also called "diatomaceous earth") is commonly found as a chalky sedimentary rock composed of the skeletal remains of single celled aquatic water plants called diatoms. Many modern diatomite deposits were laid down by sedimentation in shallow waters years ago. Subsequent geologic uplift has raised these beds to positions where they can be mined by conventional methods. Deposits are found in numerous parts of the world, with one of the largest and purest deposits being located on the central California coast. In other locations, there are currently shallow bodies of water where diatom deposition has occurred and/or is currently occurring. Such deposits are presently mined by dredging. Diatomite products are marketed under the trademark "CELITE" by the Johns-Manville Corporation. A typical dry diatomite analysis is shown in Table I below.

TABLE I

| Component | Wt. % |
|---|---|
| $SiO_2$ (a) | 86.0 |
| $Al_2O_3$ | 3.6 |
| $Fe_2O_3$ | 1.3 |
| Group I Oxides | 1.2 |
| Group II Oxides | 1.1 |
| Other | 0.5 |
| Water | 3.0 |
| Loss on Ignition | 3.6 |

Note:
(a) predominately in amorphous form

In the conventional production of diatomite, the raw ore is mined, dried and crushed to separate gangue materials and to put the diatomite in small particle form which may be easily conveyed as by air conveying. In the prior art calcination processes (other than the Riede process), the cleaned and crushed diatomite powder would either be conveyed directly to rotary kilns for a prolonged calcination or would be mixed with dry powdered flux material and the mixture then conveyed for flux calcination in a similar manner. The Riede process differed only in the addition of a binder such as water (usually containing dissolved flux) to the diatomite powder to form irregular randomly shaped agglomerates which could be calcined at somewhat lower temperatures but over the same prolonged time period.

In the process of this invention, however, the cleaned and crushed diatomite is mixed with enough water to form a wetted diatomite containing from about 15 to about 50 weight percent water based on the total weight of the wetted diatomite. Where the diatomite initially has a certain water content, the amount of water added will be less than the amount of water which must be added to dry diatomite. In either case, however, the final water content will be in the 15 to 50, preferably 20 to 40, weight percent range. Water contents of less than 15 weight percent do not permit formation of the wetted diatomite into balls of sufficient integrity to be conveyed and handled in the subsequent calcination. Quantities of water greater than 50 weight percent cause migration of flux to the surface of the wetted diatomite, which results in subsequent non-uniformity of calcination, while requiring the use of greater amounts of heat to remove the excess water during the calcination.

The particle size of the diatomite feed or the particular type of diatomite used is not critical in this invention. Satisfactory balling and calcination have been obtained using conventional clean diatomite or diatomite recycled from other diatomite crushing and classifying processes as well as using diatomite waste such as bag house dust particles and similar ultra-fine diatomite particles. The application of this process to the fine dust and other waste materials also provides the advantage that portions of materials which would otherwise be discarded may now be recycled and recovered to form usable products. Generally the diatomite feed to the balling step will be in the form of particles having a median equivalent spherical diameter in the range of from about 1 to about 20 $\mu$m, although median particle sizes above and below this range may also be used successfully in this process. The particular particle size range for any given feed will, of course, vary depending on the particular material used; the equivalent spherical diameters just mentioned are the median particle diameters for each given feed.

The moisture necessary to provide the proper moisture content may be added to the diatomite by any convenient method. The most preferred method, both from the point of view of convenience and also because it eliminates the need to store and/or transport the wetted diatomite with its significant water content, consists of mixing some portion of the water (generally approximately between about one-third and two-thirds of the total desired water content) with the dry diatomite just prior to feeding the diatomite to the balling disc and then spraying the diatomite with the remainder of the water (referred to as the "finishing water") in the manner of normal ore balling practice. This preferred procedure also has the advantage that it substantially reduces or eliminates dusting of dry diatomite on the balling disc. Any flux and/or whitening agent may be dissolved in either or both of the quantities of added water. Alternatively, the diatomite may be fed dry to the balling disc and the total water addition (with dissolved flux and/or whitening agent, if any) applied to the diatomite on the disc. Another alternative method involves spraying the dry or slightly moist diatomite feed with a flux solution to establish the desired diatomite-to-flux ratio prior to feeding the diatomite to the balling disc and then spraying additional water onto the diatomite on the disc to bring the final water content up to the desired level. Another alternative is to spray water into the air conveying system which conveys the diatomite granules from the crushing and cleaning operation or other diatomite source such as bag house dust and let the moisture be absorbed onto the diatomite during the air conveying. Water can also be sprayed onto agitated beds of diatomite, but it will be more difficult in this manner to assure equal dispersion of the moisture throughout the mass of diatomite particles. Other systems suitable for batch treating include placing the diatomite in a tumbler mixer and spraying water into the mixer while the diatomite is being tumbled. Another method of combining the water and diatomite which may be advantageous utilizes a continuous mixer into which the raw materials are continuously fed and from which a thoroughly mixed blend is removed and continuously fed directly to the balling disc. Other appropriate liquid-solid contacting techniques and devices suitable for incorporating the appropriate amount of water into the diatomite will be readily apparent to those skilled in the art.

If a flux is to be added to the diatomite to produce a flux calcined product, the flux can be added as a solution dissolved in a water spray or mixing water as mentioned in the preceeding paragraph. Alternatively, dry flux powder can be incorporated into the mass of diatomite particles either during air conveying of the diatomite or by dry mixing of the flux and diatomite in conventional dry mixing devices such as tumblers. Most conveniently, however, the flux is dissolved in the water spray or mixing water. The amount of flux used in the present invention is the same as quantity used in prior art processes such as the Riede process. Normally there will be from about 3 to about 10 weight percent flux based on the weight of dry diatomite. Typical fluxes include alkali metal salts such as sodium carbonate ("soda ash"), sodium chloride, sodium hydroxide and sodium silicate. Those skilled in the art will be well aware of the appropriate quantity of flux to use for any particular type of flux and type of diatomite.

It is also frequently desirable to calcine the diatomite in the presence of a whitening agent either in addition to or instead of a flux. Orthophosphic acid and other phosphorus acids and oxy salts are known whitening agents. The whitening agent will be present as from about 5 to about 12 weight percent based on the weight of dry diatomite. The concept of phosphoric acid and oxy salt whitening is described in U.S. Pat. No. 2,701,240 to G. W. Bregar. The use of orthophosphoric acid as a whitener has the advantage of producing whitened product without any significant agglomeration of the diatomite powder, other than that resulting from the wetting and balling of this process. Since the fine powders can then be calcined and thereafter readily reduced to fine powder form, this process used with the phosphoric acid whiteners provides a convenient way to make fine white floss powders. These products also are significantly less abrasive than flux calcined powders.

If a flux and/or whitening agent is present, the water content of 15 to 50, preferably 20 to 40, weight percent will be based on the total weight of the wetted mixture of water, diatomite, flux and/or whitening agent.

Following the water addition to the diatomite, the wetted material is conveyed to a balling device. It is the formation of the generally spherical balls in this step of the invention that distinguishes the invention from the prior art processes, notably the Riede process. Although the exact reason for the superiority of this invention has not been fully determined, a number of observations can be made which relate to this superiority:

1. The diatomite balls are in the form of only slightly compressed agglomerates. This does not result in the destruction of the fine internal structure of the diatoms, as occurs in the prior art high compression shaping methods of pellet pressing, brick making or extrusion.

2. The diatomite balls produce a calcination bed of substantially uniform porosity. Hot calcining air can freely contact essentially the entire surface of all balls. The porosity allows for free exhaust of water vapor and gaseous combustion products from the burning of the organic content of the diatomite (the "loss on ignition" component shown in Table I) without degradation of the ball form. There is no pressure build-up to cause exploding, spalling or fracturing of the balls.

3. Dusting is minimized with the balled diatomite as compared with the typical air passage and/or tumbling of diatomite powder in a prior art rotary kiln.

4. Calcination of the spherical balls is extremely uniform throughout each ball.

5. The calcined balled diatomite contains significantly less sintered glass in the final product because the uniformity of calcination has resulted in the virtual elimination of hot spots in the diatomite mass.

6. The invention enables one to take very fine diatomite particles (i.e., particles of about 3 $\mu$m size or smaller, often referred to as "dust"), put it in contact with a flux and/or whitening agent, and process it through a calcining kiln, because the wetting causes the fine dust particles to aggregate as balls of a size which will not be blown out of the kiln as would be the individual dust particles. This permits the recovery and utilization of fine dust particles (which are often of quite high purity) which with prior art processes would have simply been discarded.

The balling process and balling devices generally are described in Perry et al, *Chemical Engineers' Handbook* (5th edn., 1973), pages 8-61 to 8-64. The diatomite balling can be accomplished with any conventional type of balling device such as a balling disc or balling drum. A number of different types of balling devices are described in the literature and are commercially available in the marketplace. Their general configuration is shown in patents such as U.S. Pat. Nos. 3,140,326 and 3,206,528. Basically, balling discs are shallow cylindrical devices mounted at an acute angle to the horizontal and rotated about the cylindrical axis. The granulated materials are fed onto the surface of the rotating disc and roll down the surface of the disc as the disc rotates. The rolling action causes the particles to collide with each other and agglomerate into larger granules. As the granules are continually turned and carried back to the top of the disc to be rolled down again, they form generally spherical shapes and gradually increase in diameter. Eventually they reach the desired size and are discharged over the lip of the disc. Balling drums are similar in operation but deeper and the material being balled slowly passes through the hollow drums and exits at the lower end. Commercial balling discs can be operated so as to produce a limited size range of spherical balls exiting from the disc. In the present invention, it has been found most satisfactory to have balls of approximately 1.5 to 20 mm diameter. These are large enough in diameter that even when closely packed together they provide ample flow channels for the hot calcining air to pass through the bed of balls either in a travelling grate or a fluidized bed and yet are not so large that the flow of air and heat to the interior of the porous ball for thorough calcination is significantly impeded. Sizes of balls greater or less than this size range can also be used, but at lesser sizes the air flow rate through the bed of balls will be lessened and at larger ball diameters the calcination time will be increased because of the extra time necessary for the interior of the balls to be properly heated to calcination temperature. The preferred ball size will depend on the type of equipment subsequently to be used for calcination. For fluid bed calcination ball diameters of approximately 1.5 to 7.5 mm are preferred, while for traveling grate calcination larger sizes, typically 10 to 20 mm, are preferred.

The balls formed during the balling step have sufficient physical integrity to be conveyed to the calcination step. They are normally hard enough to resist attrition and crumbling but can be crushed between one's fingers. In some cases, however, the integrity is minimal for the degree of handling to be encountered, and in such cases it is desirable to add a small amount of an organic binder to impart increased strength and resistance to handling of the green balls. One such oganic binder which has proved quite satisfactory is a gelatinized yellow corn flour available commercially form Illinois Cereal Mills, Inc. under the trade designation "961 Mogul." Quantities of binder up to about 1% by weight of the wetted mixture of materials is sufficient. It is expected that quantities on the order of about 0.5% will be most suitable. After calcination, the balls are still in their generally spherical form but have become significantly harder. Those formed by fluxing with sodium salts (such as soda ash) are significantly harder than those calcined with phosphoric acid. Phosphoric acid calcined materials, however, can be thoroughly calcined in less time than the soda ash calcined materials and generally produce finished diatomite products with lower pH's and lower wet densities. The sodium salt flux calcined materials, on the other hand, have a lower surface area and are significantly harder and more abrasive. The organic binder burns out, of course, during calcination, leaving a clean calcined diatomite which is readily crushed to the desired granular particle size depending on the end use contemplated.

Following balling, the diatomite balls are conveyed to a calcination unit. This may be a rotary kiln but more preferably would be a travelling grate, an externally heated tube furnace or fluidized bed. The use of a travelling grate insures that there will be minimum degradation or attrition through motion of the balls, since in a travelling grate calciner the balls remain motionless on the bars of the grate. A fluidized bed is also quite useful in this invention, for the air flow rate through the fluidized bed can be adjusted so as to minimize the abrasive or erosive contact of the balls with each other or with the sides of the fluidized bed vessel. In all cases the balled materials of this invention afford complete and uniform calcination of the diatomite in a manner much superior to the prior art processes, even those such as Riede's or Fennell's which utilized water. Where the diatomite is calcined in a rotary kiln in the form of powder, the occurrence of "hot spots" is common. In a rotary kiln the powdered diatomite simply slides down the side of the rotating kiln, so much of the powder at the surface of the mass of diatomite becomes overheated, causing sintering or melting and glass formation. The balls of diatomite of this invention, on the other hand, roll freely within a rotary kiln, exposing all surfaces essentially equally and evenly for calcination. Fluidized beds of fine powders are not usable because of high attrition of the granules by the gas flow and excessive entrainment and loss of the fine powders. Powders cannot be utilized in conventional traveling grate devices because they will not be properly retained in the grate bars.

Temperatures of calcination will be on the order of from about 1700° F. to about 2350° F. (925° C. to 1290° C.), preferably 1800° F. to 2200° F. (980° C. to 1200° C.). Calcination times may be on the order of about 0.5 to about 30 minutes, but the shorter times are preferred; calcination times on the order of from about 0.75 to 30 minutes, preferably 0.75 to about 12 minutes, in the zone of calcination temperature have been found to be quite adequate for producing good calcined materials. The optimum ranges of time and/or temperature for use in this process will depend on the particular type of calcination equipment used. Those skilled in the art of calcination will readily be able to determine the most appropriate conditions to use with any given feed material in specific calcination equipment.

The resultant calcined or flux calcined materials are, following calcination, crushed and classified by particle size for end use as filter aids, floss powders, fillers, flattening agents, brightening agents and the like. The products are found to be essentially indistinguishable from calcined and flux calcined diatomite products produced according to the Riede process or rotary kiln prior art processes, both of which require significantly longer times at calcining temperatures in order to form finished products.

The following examples will illustrate the superior effects of this invention. A discussion of the significance of each example follows each set of Tables. It should be noted that most of the individual examples shown are in fact single runs chosen as representative of a group of similar runs, and therefore should be considered as illustrating operations generally rather than as being unique. It will also be understood that the specific numerical values shown will differ slightly among similar runs of a group because of normal experimental and operational variations.

In the Examples shown in Tables II-VI, diatomite of the composition shown in Table I was, for flux calcining, mixed with flux (sodium carbonate dissolved in water) in 25 lb. (11.4 kg) batches in a commercial mixer. The aforesaid "961 Mogul" binder was also added at this point if used. The mixed and partially wetted diatomite (usually containing about 50-60 percent of the desired moisture) was then fed to a one meter diameter concrete lined balling disc. The remainder of the water was added to the diatomite on the disc by a fine water spray. Variables such as feed rate, feed location, amount and location of water spray and rotational speed were adjusted until equilibrium conditions were obtained. Physical properties of the diatomite feed material are shown in Table II.

TABLE II

| Particle Size Analysis (a) | |
|---|---|
| Particle Size, μm | Percent Smaller |
| 40 | 98 |
| 30 | 95 |
| 20 | 87 |
| 10 | 65 |
| 8 | 55 |
| 6 | 45 |
| 4 | 30 |
| 2 | 15 |
| 1 | 5 |

| Other Physical Properties | |
|---|---|
| Color | Light Gray |
| Adsorption: | |
| Water | 275% |
| Oil | 215% |
| True Specific Gravity | 2.0 |
| pH | 6.9 |
| Loose Weight | 6.4 lb/ft$^3$ (0.10 g/cm$^3$) |
| Wet Density | 15.4 lb/ft$^3$ (0.25 g/cm$^3$) |
| Surface Area | 20-30 m$^2$/g |

Note:
(a) measured by Coulter counter

The green balls were tested for compressive strength, deflection from original diameter and impact resistance. The last was determined by dropping balls repeatedly onto a steel plate from heights of 12 or 18 inches (30 or 46 cm) until failure occurred; the data shown are the number of drops before failure. For all tests the data presented below represents average values taken from several repetitions of each test. Green balls were tested in some cases both wet (directly off the balling disc) and dry (after drying for moisture analysis); dry data are separately identified.

TABLE III

GREEN BALL DATA

| Test No: | 1 | 2 | 3 | 4 | 5 | 6 | 7 | 8 | 9 |
|---|---|---|---|---|---|---|---|---|---|
| Feed Composition (a) | | | | | | | | | |
| Diatomite, % | 95.23 | 95.23 | 95.23 | 95.23 | 94.34 | 94.34 | 94.34 | 94.35 | 94.34 |
| Soda Ash, % | 4.77 | 4.77 | 4.77 | 4.77 | 4.72 | 4.72 | 4.72 | 4.72 | 4.72 |
| Corn Binder, % | — | — | — | — | 0.94 | 0.94 | 0.94 | 0.94 | 0.94 |
| Moisture Content, % | 54.4 | 61.3 | 20.9 | 23.1 | 33.6 | 27.4 | 27.4 | 27.4 | 27.4 |
| Ball Diameter (b) | | | | | | | | | |
| inches | 0.50 | 0.50 | 0.51 | 0.54 | 0.47 | 0.48 | 0.48 | 0.46 | 0.46 |
| mm | 12.7 | 12.7 | 13.0 | 13.7 | 11.9 | 12.2 | 12.2 | 11.7 | 11.7 |
| Compressive Strength (c) | | | | | | | | | |
| Wet: lbs | 2.1 | 2.1 | 0.4 | 0.5 | 1.7 | 2.2 | 1.3 | 1.3 | 1.3 |
| kg | 0.95 | 0.95 | 0.18 | 0.23 | 0.77 | 1.00 | 0.59 | 0.59 | 0.59 |
| Dry: lbs | 6.8 | 6.8 | 1.7 | 1.7 | 4.6 | 4.6 | 4.9 | 4.9 | 4.9 |
| kg | 3.1 | 3.1 | 0.77 | 0.77 | 2.1 | 2.1 | 2.2 | 2.2 | 2.2 |
| Deformation, % | 17.1 | 17.1 | 9.5 | 11.7 | 7.2 | 7.1 | 7.2 | 6.4 | 6.4 |
| Impact Resistance | | | | | | | | | |
| Wet: from 12" (30 cm) | 20+ | 20+ | 4 | 5 | 8 | 14 | 9 | 7 | 7 |
| from 18" (46 cm) | 16 | 16 | 3 | 4 | 6 | 7 | 6 | 5 | 5 |
| Dry: from 12" (30 cm) | 20+ | 20+ | 12 | 11 | 20+ | 20+ | 20+ | 20+ | 20+ |
| from 18" (46 cm) | 20+ | 20+ | 7 | 5 | 18 | 18 | 18 | 18 | 18 |
| Bulk Density | | | | | | | | | |
| lb/ft$^3$ | 38.1 | 38.1 | 16.6 | 17.0 | 24.8 | 25.9 | 21.7 | 22.2 | 22.2 |
| g/cm$^3$ | 0.61 | 0.61 | 0.27 | 0.27 | 0.40 | 0.41 | 0.35 | 0.36 | 0.36 |

Notes:
(a) dry basis
(b) average
(c) balls of known diameter individual loaded on a Chatillon spring-scale tester to failure These green balls were then fed to a pot (batch) grate furnace for calcination. This unit was cylindrical, sealed and refractory-lined and had a 1.0 ft$^2$ (929 cm$^2$) grate area test section. Green ball depth was maintained at 8 inches (20.3 cm), the hearth layer depth (when used) was maintained at 2 inches (5.1 cm) and the pressure drop of hot air across the bed was maintained at 8 inches (20.3 cm) of water. Calcination process steps studied included the use of downdraft drying, preheat, ignition, recuperation and cooling, as well as the use of a hearth layer. Tables IV and V below indicate when each step was used and what the step condition variables were.

TABLE IV

Processing Data

| Test No.: | 1 | 2 | 3 | 4 | 5 | 6 | 7 | 8 | 9 |
|---|---|---|---|---|---|---|---|---|---|
| Downdraft Drying | X | X | X | X | X | X | X | X | X |
| Downdraft Preheat | X | X | | | | | | | |
| Downdraft Ignition | X | X | X | X | X | X | X | X | X |
| Downdraft Recuperation | X | X | X | X | | | | | |
| Downdraft Cooling | X | X | X | X | X | X | X | X | X |
| Hearth Layer | X | X | X | X | X | X | | | |
| Maximum Bed Temperature | | | | | | | | | |
| °F. | 1873 | 1820 | 2025 | 1950 | 2030 | 2000 | 2070 | 2100 | 2315 |
| °C. | 1022 | 993 | 1107 | 1065 | 1110 | 1093 | 1132 | 1149 | 1268 |

TABLE V

Processing Step Variable Ranges

| | |
|---|---|
| Downdraft Drying | |
| Time | 3–8 minutes |
| Gas Pressure Drop | 6.5–8.5 in. water |
| | 16.5–21.6 cm water |
| Gas Flowrate | 309–379 std. ft$^3$/min. |
| | 8.7–10.7 std. m$^3$/min. |
| Gas Temperature | 735–829° F. |
| | 391–443° C. |
| Downdraft Preheat | |
| Time | 5–7 minutes |
| Gas Pressure Drop | 6.1–8.1 in. water |
| | 15.5–20.6 cm water |
| Gas Flowrate | 287–357 std. ft$^3$/min. |
| | 8.1–10.1 std. m$^3$/min. |
| Gas Temperature | 1324–1573° F. |
| | 717–856° C. |
| Downdraft Ignition | |
| Time | 5–11 minutes |
| Gas Pressure Drop | 7.9–10.8 in. water |
| | 20.1–27.4 cm water |
| Gas Flowrate | 230–367 std. ft$^3$/min. |
| | 6.5–10.4 std. m$^3$/min. |
| Gas Temperature | 1820–2315° F. |
| | 993–1268° C. |
| Downdraft Recuperation | |
| Time | 2–4 minutes |
| Gas Pressure Drop | 7.3–8.1 in. water |
| | 18.5–20.6 cm water |
| Gas Flowrate | 224–380 std. ft$^3$/min. |

TABLE V-continued

| Processing Step | Variable Ranges |
|---|---|
| | 6.3–10.8 std. m³/min. |
| Gas Temperature | 1575–1703° F. |
| | 857–928° C. |
| Downdraft Cooling | |
| Time | 4–7 minutes |
| Gas Pressure Drop | 3.5–8.0 in. water |
| | 8.9–20.3 cm water |
| Gas Flowrate | 337–467 std. ft³/min. |
| | 9.5–13.2 std. m³/min. |
| Gas Temperature | 652–934° F. |
| | 344–501° C. |
| Hearth Layer | |
| Weight | 2.0–3.0 lbs. |
| | 0.9–1.4 kg |

The calcination feed weight and moisture content as well as the calcined product properties are shown in Table VI below. "Blue Light Brightness" is defined as the percentage of blue reflectance measured by using a blue tristimulus felter with a Photovolt Reflection Meter Model 670 or equivalent device. By convention "Blue Light Brightness" values are reported as pure numbers rather than having the "percent" label appended. "Percent Yellow" is determined on the same type of device according to the formula:

(amber value−blue value) / (green value)

where each "value" is the percentage of that color's reflectance measured with the same color's tristimulus filter. Yellowness is a measure of the closeness to white (0=pure white) with the higher positive values having more yellow content. By convention "Percent Yellow" values are reported as percentages.

this invention, and also the limitations of the process. Tests 1 and 2 show the detrimental effects of having water contents in excess of 50%. The balls which were obtained had hard shells but the interiors were not calcined. This was a direct result of the mobile soda ash flux having migrated to the ball surface because of the high water content. Tests 3 and 4 are illustrative of balls made with no organic binder; their impact resistance and bulk density is seen to be lower than those of balls containing binder. The final product properties are seen to be quite acceptable, however. Tests 3 and 4 also illustrate that preheating of the green balls can be optional. Tests 5 and 6 illustrate that recuperation is also optional. In these tests only the three critical calcination-related steps—drying, ignition (calcination itself) and cooling—were used, with the presence of a hearth layer. Tests 7 and 8 show that the hearth layer usage is also optional. These two tests also represent the experimental runs most closely analogous to expected commercial operations. Finally, Test 9 shows the effects of high temperature calcination. It will be evident from these data that a wide variety of raw material properties and operating conditions can be used, and that all properties and conditions within the defined limits of the invention will produce quite acceptable results.

Table VII below illustrates the use of this invention to process several different grades of diatomite, including materials which might otherwise be considered substandard or waste products. Each sample was calcined in a laboratory rotary tube furnace having a 2 ft (60 cm) long hot zone with phosphoric acid (10 wt %) for 45 seconds at 1900° F. (1040° C.) with the furnace at a 6° slope and rotating at 12 rpm. The diatomite was balled to ball diameters of −5 +10 mesh (1.7 to 4.0 mm).

TABLE VI

| | Calcination Feed and Product | | | | | | | | |
|---|---|---|---|---|---|---|---|---|---|
| Test No: | 1 | 2 | 3 | 4 | 5 | 6 | 7 | 8 | 9 |
| Feed Weight, lbs | 29.5 | 34.5 | 12.0 | 12.5 | 18.0 | 17.0 | 17.0 | 15.5 | 16.5 |
| kg | 13.6 | 15.6 | 5.4 | 5.7 | 8.2 | 7.7 | 7.7 | 7.0 | 7.5 |
| Moisture Content, % | 54.4 | 61.3 | 20.9 | 23.5 | 27.6 | 25.9 | 26.7 | 28.5 | 28.7 |
| Product Weight, lbs | 11.5 | 14.5 | 10.0 | 9.5 | 10.0 | 11.7 | 11.4 | 10.4 | 10.3 |
| kg | 5.2 | 6.6 | 4.5 | 4.3 | 4.6 | 5.3 | 5.2 | 4.7 | 4.7 |
| Average Compressive Strength, lbs | 23.1 | 17.1 | 11.8 | 17.1 | 23.7 | 50.0 | 25.0 | 23.9 | 59.0 |
| kg | 10.5 | 7.8 | 5.4 | 7.8 | 10.7 | 22.7 | 11.3 | 10.8 | 26.8 |
| Blue Light Brightness | n.m. | n.m. | 80.0 | 80.5 | 87.0 | 83.0 | 90.0 | 90.5 | 86.5 |
| Percent Yellow, % | n.m. | n.m. | 6.5 | 6.4 | 5.0 | 3.5 | 3.2 | 3.7 | 2.8 |
| Permeability, darcies | n.m. | n.m. | n.m. | 1.19 | 0.96 | 0.96 | 0.58 | 0.58 | n.m. |

Note:
"n.m." means "not measured"

Tables II–VI illustrate the different raw material and operating variables which can be used in the process of

TABLE VII

| | Material | | | |
|---|---|---|---|---|
| Test No. | 10 | 11 | 12 | 13 |
| Nature of Feed | 90% good material; can be used to make many products in prior art processes | 80% good material; 20% contamination; usable in prior art process to form some products | 75% good material; usable in prior art processes but poorer than B | 60% usable diatomite, 40% contamination; often considered to be waste material |
| Specific Problems of Feed | low filter cake permeability | low filter cake permeability | low blue light value | all properties substandard |
| Feed Properties | | | | |
| Wet Density, lb/ft³ | 15.0 | 16.7 | 16.7 | 20.8 |
| g/cm³ | 0.24 | 0.27 | 0.27 | 0.33 |
| Loose Weight, lb/ft³ | 7.1 | 7.3 | 7.3 | 10.2 |
| g/cm³ | 0.11 | 0.12 | 0.12 | 0.16 |
| Blue Light Brightness | 67.2 | 62.0 | 56.3 | 53.6 |
| Final Water Content (as balled), wt % | 25.0 | 21.2 | 19.0 | 20.6 |

TABLE VII-continued

| Test No. | Material | | | |
|---|---|---|---|---|
| | 10 | 11 | 12 | 13 |
| Product Properties | | | | |
| Color | white | white | white | white |
| Blue Light Brightness | 90.5 | 89.0 | 89.0 | 86.5 |
| Percent Yellow | 1.1 | 3.3 | 3.3 | 4.5 |
| pH | 2.9 | 3.8 | 5.2 | 5.4 |

It will be evident from these data that even "waste" material can be reclaimed to some extent by this process.

The data of Table VIII below illustrate the ability of this process to produce good products from both commercial diatomite powders and also from fine materials which, while of good purity, have heretofore been composed of particles too small (i.e., "dust" particles) to be handled for calcination.

TABLE VIII

| | "Dust" Processing | | | | | | | |
|---|---|---|---|---|---|---|---|---|
| Test No.: | 14 | | 15 | | 16 | | 17 | |
| Feed | "production material" | | | | "dust" | | | |
| Mean Particle Size, μm | 9.5 | | 9.5 | | 2.0 | | 2.0 | |
| Soda Ash Flux, % | — | | 5 | | — | | 5 | |
| H₃PO₄ Whitener, % | 10 | | — | | 10 | | — | |
| Balls | | | | | | | | |
| Moisture, % | 19.3 | | 22.1 | | 20.4 | | 21.4 | |
| Diameter, in. | | | 0.08 to 0.15 | | | | | |
| mm. | | | 2.0 to 4.0 | | | | | |
| Calcination | | | | | | | | |
| Temperature, °F. | 1900 | | 2000 | | 1900 | | 2000 | |
| °C. | 1037 | | 1093 | | 1037 | | 1093 | |
| Time, minutes | 0.75 | | 2.5 | | 0.75 | | 2.5 | |
| Product Fractions: | Coarse | Fine | Coarse | Fine | Coarse | Fine | Coarse | Fine |
| Yield, % | 54.7 | 28.7 | 78.3 | 11.1 | 44.9 | 41.5 | 60.6 | 29.1 |
| Mean Particle Size, μm | n.m. | n.m. | n.m. | n.m. | 7.8 | 3.4 | 9.2 | 3.3 |
| Blue Light Brightness | 82 | 85 | 81 | 75 | 86 | 88 | 85 | 92 |
| Percent Yellow, % | 6.9 | 5.1 | 4.2 | 3.2 | 3.4 | 3.4 | 2.3 | 0.6 |
| pH | 5.8 | 5.8 | 10.1 | 9.9 | 5.6 | 5.4 | 10.0 | 9.7 |
| Loose Weight | | | | | | | | |
| lb/ft³ | 7.3 | 6.1 | 10.6 | 8.1 | 6.3 | 6.2 | 10.1 | 11.0 |
| g/cm³ | 0.12 | 0.10 | 0.17 | 0.13 | 0.10 | 0.10 | 0.16 | 0.18 |
| Wet Density | | | | | | | | |
| lb/ft³ | 12.6 | 15.3 | 18.4 | 27.8 | 13.0 | 15.2 | 18.9 | 30.6 |
| g/cm³ | 0.20 | 0.25 | 0.29 | 0.45 | 0.21 | 0.24 | 0.30 | 0.49 |
| Surface Area, m²/g | 6.3 | 8.7 | 2.8 | 5.9 | 6.7 | 10.0 | 2.9 | 4.7 |
| Absorption, g/100g | | | | | | | | |
| Oil | 233 | 220 | 172 | 118 | 252 | 226 | 167 | 118 |
| Water | 254 | 258 | 205 | 160 | 236 | 234 | 151 | 146 |
| Permeability, darcies | n.m. | n.m. | 1.08 | n.m. | 0.46 | n.m. | 0.58 | n.m. |

Note: "n.m." means "not measured"

It will be apparent from these data that the balling technique of this invention permits recovery of "dust" in yields equivalent to the recovery of ordinary diatomite, and subsequent production of product material having properties equivalent to that produced from conventional raw materials.

Tables IX and X below illustrate details of typical balling and calcinations runs using the process of this invention. In the runs described, balling was performed on a 54-inch (1.37 m) balling disc having an outer reroll ring and a bed depth adjustable from 5 to 8 inches (13 to 20 cm). The disc was powered by a 3 hp (2238 W) motor and had a rotational speed variable between 11 and 21 rpm. Disc angle was variable between 37° and 50° from the horizontal. Spray nozzles were located at the "8 o'clock" and "9 o'clock" positions on the face of the disc. Rotation was clockwise. Three scrapers (the outer one located at the "11 o'clock" position and the two inner ones at the "2 o'clock" position) were used to keep the bed of balling diatomite level.

TABLE IX

| | Balling Data |
|---|---|
| Moistened Diatomite | |
| Feed Rate, lb/min. | 5.5 |
| kg/min. | 2.5 |
| Disc Rotation, rpm. | 16-18 |
| Disc Angle (from the horizontal) | 42° |
| Disc Bed Depth | 7" (18 cm) |
| Total Spray Flow, gal/min. | 0.25-0.27 |
| l/min. | 0.95-1.02 |
| Ball Sizes: | −5 + 10 mesh (1.7-4.0 mm) |
| Ball Production Rate | |
| lb/min. | 7.0 |
| kg/min. | 3.2 |
| Ball Moisture Content, avg. | 28.5% |
| Flux (Soda Ash) Content | 3.5% |

TABLE X

| | Calcination Data | | |
|---|---|---|---|
| Test No. | 18 | 19 | 20 |
| Calcination Conditions | | | |
| Temperature, °F. | 1800 | 2000 | 2000 |
| °C. | 982 | 1093 | 1093 |
| Time, minutes | 30 | 30 | 2.5 |
| Type of Furnace | Rotary Kiln | Rotary Kiln | Tube Furnace |
| Milled Product | | | |
| Coarse Fraction, % | 20.0 | 17.5 | 41.2 |
| Medium Fraction, % | 67.0 | 73.0 | 50.3 |
| Fine Fraction, % | 10.0 | 6.5 | 7.5 |
| Loss, % | 3.0 | 3.0 | 1.0 |
| Medium Fraction Properties | | | |
| Permeability, darcies | 1.49 | 2.31 | 1.45 |
| Wet Density, lb/ft$^3$ | 13.0 | 14.7 | 14.9 |
| g/cm$^3$ | 0.21 | 0.24 | 0.24 |
| Loose Weight, lb/ft$^3$ | 7.3 | 12.0 | 8.6 |
| g/cm$^3$ | 0.12 | 0.19 | 0.14 |
| +150 Mesh (+105 μm), % | 0.1 | 0.6 | 0.6 |
| Blue Light Brightness | 85.4 | 84.2 | 86.2 |
| Percent Yellow, % | 2.8 | 2.0 | 1.7 |

Statement of Industrial Application

The invention herein is useful in the formation of diatomite filter aids. Such filter aids find commercial and industrial use in the filtration of a wide variety of liquid materials including beverages such as beer, wine and fruit juices; water in municipal water purification systems; industrial chemicals such as sodium hydroxide, sulfuric acid and machine oils; and such other materials as antibiotics, paints and varnishes, solvents, and sugar syrups. It is also useful in the manufacture of white diatomite floss powders, fillers, flatteners and whiteners for paints, plastics and films.

I claim:

1. A process for the calcination of diatomite in which the time at temperature required to calcine a quantity of diatomite is reduced, which process comprises:
   (a) mixing with said quantity of diatomite a quantity of water sufficient to produce a mixture comprising water and diatomite with a water content in the range of 15 to 50 weight percent moisture based on the total weight of materials;
   (b) forming said moistened diatomite mixture into generally spherical balls; and
   (c) calcining said balls at a temperature in the range of about 1700° F. to about 2350° F. for a period of from about 0.75 to about 30 minutes.

2. A process as in claim 1 wherein there is also a flux of whitening agent incorporated into said mixture balls prior to calcining of said balls.

3. A process as in claim 2 wherein a flux is present in an amount of from 3 to 10 weight percent based on the total weight of materials.

4. A process as in claims 2 or 3 wherein said flux is an alkali metal salt.

5. A process as in claim 4 wherein said flux is sodium carbonate sodium silicate, sodium hydroxide or sodium chloride.

6. A process as in claim 5 wherein said flux is sodium carbonate.

7. A process as in claim 2 wherein a whitening agent is present in an amount of from 5 to 12 weight percent based on the total weight of materials.

8. A process as in claims 2 or 7 wherein said whitening agent is a phosphorous acid or oxy salt thereof.

9. A process as in claim 8 wherein said whitening agent is orthophosphoric acid.

10. A process as in claims 2, 3 or 7 wherein both a flux and a whitening agent are present.

11. A process as in claims 2, 3 or 7 wherein said flux or whitening agent is incorporated into said mixture as an aqueous solution of flux or whitening agent.

12. A process as in claims 1, 2, 3 or 7 wherein said water content is in the range of from about 20 to about 40 weight percent based on the total weight of all materials.

13. A process as in claims 1, 2, 3 or 7 wherein said balls have diameters in the range of from about 1.5 to about 20 mm.

14. A process as in claim 13 wherein said balls have diameters in the range of from about 1.5 to about 7.5 mm.

15. A process as in claim 13 wherein said balls have diameters in the range of from about 10 to about 20 mm.

16. A process as in claims 1, 2, 3 or 7 wherein said balls are formed on a balling disc.

17. A process as in claim 16 wherein said diatomite and a portion of said water content are mixed prior to the wetted diatomite being introduced onto said balling disc and the remainder of said water content is mixed with said wetted diatomite while said wetted diatomite is being balled on said balling disc.

18. A process as in claims 1, 2, 3 or 7 wherein said balls are calcined using a travelling grate calciner.

19. A process as in claims 1, 2, 3 or 7 wherein said balls are calcined using an externally heated tube furnace.

20. A process as in claims 1, 2, 3 or 7 wherein said balls are calcined using a fluidized bed calciner.

21. A process as in claims 1, 2, 3 or 7 wherein said calcination is conducted at a temperature in the range of from about 1800° F. to about 2200° F.

22. A process as in claim 21 wherein said calcination is conducted for a time in the range of from about 0.75 to about 12 minutes.

23. A process as in claims 1, 2, 3 or 7 wherein said calcination is conducted for a time in the range of from about 0.75 to about 12 minutes.

24. A process as in claims 1, 2, 3 or 7 wherein said diatomite is in the form of fine dust particles.

25. A process as in claims 1, 2, 3 or 7 wherein said diatomite is in the form of material normally classified as waste.

26. A process as in claims 1, 2, 3 or 7 wherein there is also included in said mixture an organic binder.

27. A process as in claim 26 wherein said organic binder is present in an amount of up to about 1.0 weight percent based on the total weight of materials.

28. A process as in claim 27 wherein said organic binder is present in an amount on the order of about 0.5 weight percent based on the total weight of materials.

29. A process as in claim 27 wherein said organic binder is a gellatinized corn flour.

* * * * *